(12) United States Patent
Macias et al.

(10) Patent No.: US 11,727,894 B2
(45) Date of Patent: Aug. 15, 2023

(54) ELECTRONIC DEVICE AND METHOD FOR CONTROLLING RENDERING OF IMAGES

(71) Applicant: SAMSUNG ELECTRONICS CO., LTD., Suwon-si (KR)

(72) Inventors: Fernando Escribano Macias, Middlesex (GB); Daniel Valdez Balderas, Middlesex (GB); Robert Rene Poncelet, Middlesex (GB)

(73) Assignee: SAMSUNG ELECTRONICS CO., LTD, Suwon-si (KR)

( * ) Notice: Subject to any disclaimer, the term of this patent is extended or adjusted under 35 U.S.C. 154(b) by 160 days.

(21) Appl. No.: 17/399,755

(22) Filed: Aug. 11, 2021

(65) Prior Publication Data
US 2022/0093056 A1    Mar. 24, 2022

(30) Foreign Application Priority Data

Aug. 12, 2020 (GB) ..................... 2012559
Nov. 25, 2020 (GB) ..................... 2018500

(51) Int. Cl.
*H04N 13/167* (2018.01)
*G06T 1/20* (2006.01)
(Continued)

(52) U.S. Cl.
CPC ........... *G09G 5/005* (2013.01); *G06F 3/1475* (2013.01); *G09G 2360/12* (2013.01); *G09G 2360/18* (2013.01)

(58) Field of Classification Search
CPC .......... G06F 3/01; G06F 3/147; G06F 3/1475; G06F 13/00; G06F 13/18; G06F 9/52; G06F 9/54; G09G 3/00; G09G 3/20; G09G 3/34; G09G 3/3208; G09G 3/3275; G09G 5/00; G09G 5/005; G09G 5/36; G09G 5/393; G09G 5/399; G09G 5/397; G09G 2360/12; G09G 2360/18; A63F 13/52;
(Continued)

(56) References Cited

U.S. PATENT DOCUMENTS 5,933,155 A    8/1999  Akeley
6,756,826 B1   6/2004  Klein et al.
(Continued)

FOREIGN PATENT DOCUMENTS

JP       6584655 B2      10/2019
WO    2016022874 A1      2/2016

OTHER PUBLICATIONS

Great Britain Search Report, dated May 13, 2021, issued by the Intellectual Property Office, Application No. GB2018500.5.
(Continued)

*Primary Examiner* — Chanh D Nguyen
*Assistant Examiner* — Nguyen H Truong
(74) *Attorney, Agent, or Firm* — Sughrue Mion, PLLC

(57) ABSTRACT

A method is provided. The method includes receiving a request for a frame buffer from an application; identifying a next frame generation duration based on history information of frame timings; identifying a next frame generation start time based on a sync time corresponding to a next vertical sync (VSYNC) signal and the next frame generation duration; and providing the frame buffer to the application at the next frame generation start time.

20 Claims, 11 Drawing Sheets

(51) Int. Cl.
*G06T 1/60* (2006.01)
*G09G 5/00* (2006.01)
*G06F 3/147* (2006.01)

(58) Field of Classification Search
CPC .... A63F 13/212; A63F 13/355; A63F 13/358; A63F 13/537; A63F 13/25; G02B 27/00; G02B 27/01; H04N 13/161; H04N 13/167; H04N 13/332; H04N 19/176; H04N 5/04; H04N 5/06; H04N 5/44; H04N 5/365; H04N 7/01; G11C 7/10; G11C 7/22; G06T 1/20; G06T 1/60; G06T 3/00; G06T 5/50; G06T 7/246; G06T 13/80; G06T 15/20; G06T 15/50; G06T 19/00
See application file for complete search history.

(56) References Cited

U.S. PATENT DOCUMENTS

| | | | |
|---|---|---|---|
| 10,176,548 B2 | 1/2019 | Cheng | |
| 10,732,411 B2 | 8/2020 | Jin | |
| 10,741,143 B2 | 8/2020 | Dimitrov | |
| 10,742,955 B2 | 8/2020 | Karivaradaswamy | |
| 11,205,294 B1 | 12/2021 | Kazem | |
| 2002/0109697 A1 | 8/2002 | Gardiner et al. | |
| 2014/0092150 A1* | 4/2014 | Slavenburg | G09G 5/001 345/698 |
| 2017/0053620 A1* | 2/2017 | Law | G09G 5/395 |
| 2017/0220062 A1 | 8/2017 | Shen et al. | |
| 2018/0300838 A1* | 10/2018 | Park | G06F 3/14 |
| 2019/0384448 A1 | 12/2019 | De Araujo et al. | |
| 2021/0044792 A1* | 2/2021 | Taylor | H04N 13/344 |
| 2021/0311307 A1 | 10/2021 | Peri et al. | |

OTHER PUBLICATIONS

International Search Report (PCT/ISA/210) and Written Opinion (PCT/ISA/237) dated Nov. 12, 2021 issued by the International Searching Authority in International Application No. PCT/KR2021/010594.

* cited by examiner

ELECTRONIC DEVICE AND METHOD FOR CONTROLLING RENDERING OF IMAGES

CROSS-REFERENCE TO RELATED APPLICATION(S)

This application is based on and claims priority under 35 U.S.C. § 119 to United Kingdom Patent Application No. 2012559.7, filed on Aug. 12, 2020, in the Intellectual Property Office of the United Kingdom, and United Kingdom Patent Application No. 2018500.5, filed on Nov. 25, 2020, in the Intellectual Property Office of the United Kingdom, the disclosures of which are incorporated by reference herein in their entireties.

BACKGROUND

1. Field

The disclosure relates to rendering images.

2. Description of Related Art

In general, latency is the time between a user performing an action on a device and the results of the action taking place, e.g., an image being displayed on a screen. High amounts of latency can result in the device being perceived as sluggish and can cause touch perception issues in user interfaces. For example, it may be difficult to correctly judge the effects of actions, especially when using applications that rely on real-time interaction.

One type of latency is rendering latency which can be caused by delays between an application and an operating system (OS) rendering stack. Rendering latency can also be the result of delays in interaction between the application and a compositor component of the OS, and also between the compositor and hardware/kernel components, such as display drivers. The compositor is part of the OS and its function is to display frames on the device's screen. In the case of the Android™ OS the compositor is known as SurfaceFlinger. Despite the need for low latency, the Android™ OS graphics stack is built for throughput rather than fast reaction. Frames are drawn as fast as possible, added to a queue and then processed in order. If an application produces frames faster than they can be processed then a large latency may be introduced due to frames taking a long time to get from the back of the queue to the front.

Embodiments may address at least one of the above problems and reduce rendering latency. Embodiments may significantly reduce latency between user input and a computer program's reaction, in particular output/display updating. Embodiments can improve touch perception without the need to modify code. Embodiments can be particularly advantageous for applications, such as games, that benefit from maximized throughput and reduced/minimized latency.

SUMMARY

According to embodiments of the disclosure, a method of controlling rendering of images includes: receiving a request for a frame buffer from an application; identifying a next frame generation duration based on history information of frame timings; identifying a next frame generation start time based on a sync time corresponding to a next vertical sync (VSYNC) signal and the next frame generation duration; and providing the frame buffer to the application at the next frame generation start time.

The identifying of the next frame generation duration may include: storing a rendering duration of each of a plurality of historically generated frames as the history information; and identifying the next frame generation duration based on the history information.

The identifying the next frame generation duration may include: identifying a safety parameter based on data about a plurality of historically generated frames; and including the safety parameter with the next frame generation duration as a margin.

The identifying of the safety parameter may include: identifying, for at least two of the plurality of historically generated frames, differences between a measured time when an operating system provided the frame buffer and unblocked the application, and an actual next frame generation start time.

The identifying of the next frame generation start time may include: identifying the next frame generation start time using percentile analysis on the plurality of historically generated frames.

The method may further include: monitoring frame rate stability; identifying the frame rate stability falls below a threshold; and reverting to default operating system frame buffer management for the rendering of images by disabling image rendering control, based on the frame rate stability falling below the threshold.

The monitoring frame rate stability may include: identifying a median frame rate based on a plurality of measured frame rates, each of which indicates a number of frames generated in one second; identifying the frame rate stability falls below the threshold based on less than a predetermined proportion of the plurality of measured frame rates over a predetermined period falling within a predetermined margin of the median frame rate.

The method may further include: monitoring any one or any combination of workload of a device or a temperature of the device; reverting to default operating system frame buffer management for the rendering of images by disabling image rendering control based on the workload exceeding a workload threshold; and reverting to default operating system frame buffer management for the rendering of images by disabling image rendering control based on the temperature exceeding a temperature threshold.

The identifying the next frame generation start time may include: identifying a safety parameter based on data about a plurality of historically generated frames; and identifying the next frame generation start time based on a formula:

$$t = \text{VSYNC}_{next} - t_r - S$$

wherein $\text{VSYNC}_{next}$ represents a next display refresh; $t_r$ represents the next frame generation duration, and $S$ represents the safety parameter.

The safety parameter may be identified using the data about the plurality of historically generated frames and a formula:

$$t_s^j - t_b^j$$

wherein $t_s^j$ represents a generation time when generation of a historical frame j, from among the plurality of historically generated frames, started, and $t_b^j$ represents a providing time when the frame buffer was provided for the historical frame j, predicting the next frame generation duration for a next frame F using percentile analysis on the data about the plurality of historically generated frames, wherein the next frame generation duration for the next frame F equals $t_s^F - t_b^F$, and wherein ti represents the next frame generation start time, and $t_b^F$ represents a providing time when the frame buffer will be provided for the next frame F.

According to embodiments of the disclosure, an electronic device for controlling rendering of images, includes: a memory storing a program including at least one instruction; and at least one processor configured to execute the at least one instruction to control the electronic device to: receive a request for a frame buffer from an application, identify a next frame generation duration based on history information of frame timings, identify a next frame generation start time based on a sync time corresponding to a next vertical sync (VSYNC) signal and the next frame generation duration, and provide the frame buffer to the application at the next frame generation start time.

The at least one processor may be further configured to execute the at least one instruction to control the electronic device to: store a rendering duration of each of a plurality of historically generated frames as the history information, and identify the next frame generation duration based on the history information.

The at least one processor may be further configured to execute the at least one instruction to control the electronic device to: identify a safety parameter based on data about a plurality of historically generated frames, and include the safety parameter with the next frame generation duration as a margin.

The at least one processor may be further configured to execute the at least one instruction to control the electronic device to: identify, for at least two of the plurality of historically generated frames, differences between a measured time when an operating system provided the frame buffer and unblocked the application, and an actual next frame generation start time.

The at least one processor may be further configured to execute the at least one instruction to control the electronic device to: identify the next frame generation start time using percentile analysis on the plurality of historically generated frames.

The at least one processor may be further configured to execute the at least one instruction to control the electronic device to: monitor frame rate stability, identify whether the frame rate stability falls below a threshold, and revert to default operating system frame buffer management for the rendering of images by disabling image rendering control, based on the frame rate stability falling below the threshold.

The at least one processor may be further configured to execute the at least one instruction to control the electronic device to: identify a median frame rate based on a plurality of measured frame rates, each of which indicates a number of frames generated in one second, and identify the frame rate stability falls below the threshold based on less than a predetermined proportion of the plurality of measured frame rates over a predetermined period falling within a predetermined margin of the median frame rate.

The at least one processor may be further configured to execute the at least one instruction to control the electronic device to: monitor any one or any combination of a workload of the electronic device or a temperature of the electronic device, revert to default operating system frame buffer management for the rendering of images by disabling image rendering control based on the workload exceeding a workload threshold, and revert to default operating system frame buffer management for the rendering of images by disabling image rendering control based on the temperature exceeding a temperature threshold.

The at least one processor may be further configured to execute the at least one instruction to control the electronic device to: identify a safety parameter based on data about a plurality of historically generated frames; and identify the next frame generation start time based on a formula:

$$t = VSYNC_{next} - t_r - S$$

wherein $VSYNC_{next}$ represents a next display refresh; $t_r$ represents the next frame generation duration, and S represents the safety parameter.

According to embodiments of the disclosure, a non-transitory computer-readable recoding medium having recorded thereon a program for executing a method is provided, the method including: receiving a request for a frame buffer from an application; identifying a next frame generation duration based on history information of frame timings; identifying a next frame generation start time based on a sync time corresponding to a next vertical sync (VSYNC) signal and the next frame generation duration; and providing the frame buffer to the application at the next frame generation start time.

According to embodiments of the disclosure, an electronic device includes: an input interface; a memory storing a program including at least one instruction; and at least one processor configured to execute the at least one instruction of the program stored in the memory to control the electronic device to: identify a next frame generation duration, identify a next frame generation start time based on the next frame generation duration and a vertical sync (VSYNC) signal, provide a frame buffer to an application at the next frame generation start time, and generate a next frame based on an input status of the input interface at the next frame generation start time.

The electronic device may further include an output interface, and the at least one processor may be further configured to execute the at least one instruction to control the electronic device to provide the next frame to the output interface based on the VSYNC signal.

The at least one processor may be further configured to execute the at least one instruction to control the electronic device to: receive a request for the frame buffer from the application, and provide the frame buffer to the application at the next frame generation start time based on the request.

The at least one processor may be further configured to execute the at least one instruction to control the electronic device to: based on the next frame being generated, store a rendering duration of the next frame in the memory as history information, and identify another next frame generation duration based on the rendering duration of the next frame.

The at least one processor may be further configured to execute the at least one instruction to control the electronic device to: update an environment of the application based on the input status at the next frame generation start time, and generate the next frame based on the environment.

The at least one processor may be further configured to execute the at least one instruction to control the electronic device to ignore a request for the frame buffer based on the request for the frame buffer being received before the next frame generation start time.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
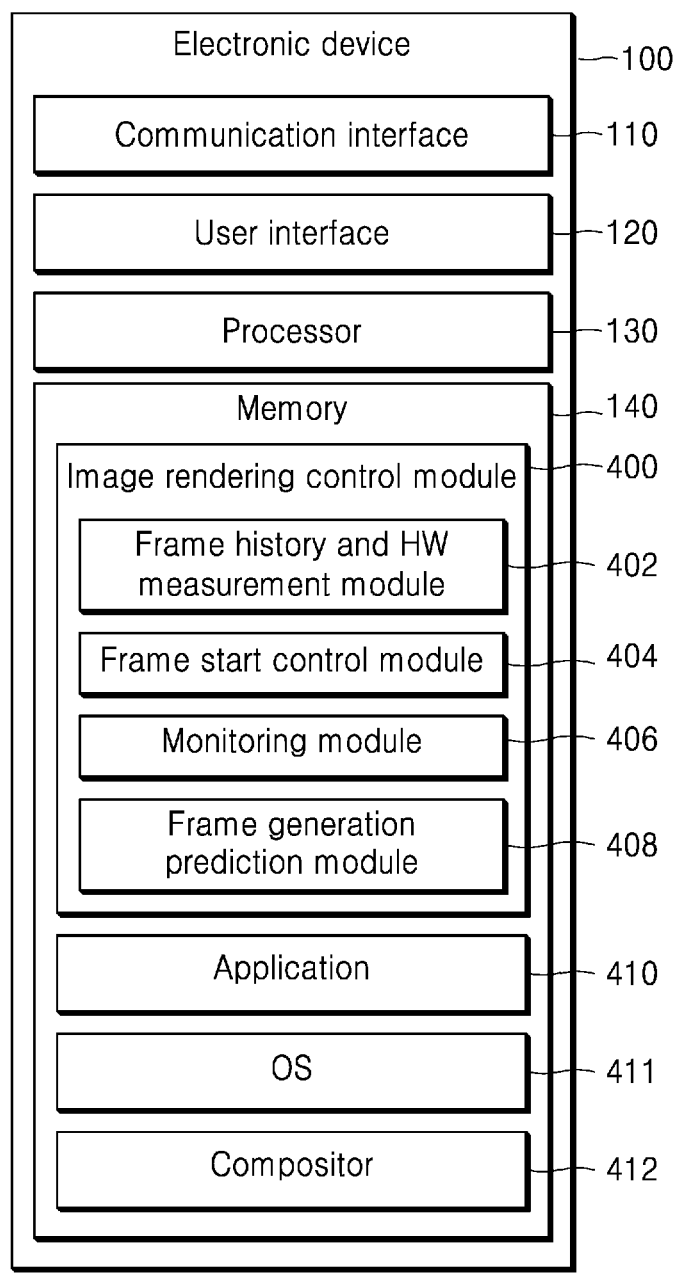
FIG. 1 is a block diagram of an electronic device 100 that performs image rendering control, according to an embodiment.

Terms including descriptive or technical terms which are used herein should be construed as having meanings that are apparent to one of ordinary skill in the art. However, the terms may vary according to intentions of those of ordinary skill in the art, precedents, the emergence of new technologies, or the like. Furthermore, specific terms may be arbitrarily selected, and in this case, the meaning of the specific terms will be described in detail. Thus, the terms used herein may be defined based on the meaning thereof and descriptions made throughout the disclosure, rather than simply on names used.

An expression used in the singular may encompass the expression in the plural, unless the context clearly indicates the term is singular. Terms used herein, including technical or scientific terms, may have the same meaning as commonly understood by one of ordinary skill in the art.

Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c. Further, the terms "1st" or "first" and "2nd" or "second" may use corresponding component regardless of importance or order and are used to distinguish a component from another without limiting the components.

When a part "includes" or "comprises" an element, unless there is a particular description to the contrary, the part may further include other elements. In addition, terms such as " . . . unit"and" . . . module" used in the disclosure refer to a unit that processes at least one function or operation, which may be embodied as hardware or software, or a combination of hardware and software.

Hereinafter, embodiments will be described in detail with reference to the accompanying drawings such that one of ordinary skill in the art may easily implement the embodiments. However, the disclosure may be implemented in various different forms and is not limited to embodiments described herein. Also, in the drawings, parts may be omitted in order to clearly describe the disclosure, and like reference numerals designate like elements throughout the specification.

Embodiments may store information relating to previously generated frames and performance measurements relating to those frames. Embodiment may access this information in order to learn and predict the timings of the next frame(s), and make decisions about the start time of future frames in order to minimize latency. The learning may be performed by receiving feedback from the OS and embodiments may check the accuracy of the predictions and the effects of decisions on future performance. Embodiments may quantify the certainty of predictions and minimize the risk of missing the chance to compose a frame. This risk may be controllable through one or more parameters. Thus, embodiment may control the start time of new frames to any arbitrary time based on the predictions. Embodiments may assess the performance and make decisions as to whether to disable or enable its image rendering control.

FIG. 1 is a block diagram illustrating an electronic device 100 that performs image rendering control, according to an embodiment.

According to an embodiment, the electronic device 100 may include an operation apparatus, such as a mobile device (for example, a smartphone or a tablet personal computer (PC)) or a general-purpose computer (a PC), capable of transmitting and receiving data to and from a server via a network.

The electronic device 100 according to an embodiment may include, at least, a communication interface 110, a user interface 120, a processor 130, and a memory 140.

The communication interface 110 may include a transceiver (transmitter and receiver), and may perform data communication with the server according to control of the processor 130. Also, the communication interface 110 may perform data communication with other electronic devices, in addition to the server.

The communication interface 110 may perform data communication with the server or the other electronic devices by using at least one of data communication methods including, for example, wired local area network (LAN), wireless LAN, Wi-Fi, Bluetooth, ZigBee, Wi-Fi direct (WFD), infrared data association (IrDA), Bluetooth low energy (BLE), near-field communication (NFC), wireless broadband Internet (Wibro), world interoperability for microwave access (WiMAX), shared wireless access protocol (SWAP), wireless gigabit alliance (WiGig), and radio frequency (RF) communication.

The user interface 120 according to an embodiment is an interface into which data for a user to control the electronic device 100 is input.

For example, the user interface 120 may include a key pad, a dome switch, a touch pad (contact capacitance type, pressure resistive type, an infrared (IR) detection type, surface ultrasonic wave conduction type, integral tension measuring type, piezo-effect type, or the like), a touch screen, a jog wheel, a jog switch, or the like, but is not limited thereto. For example, the user interface 120 may include a wireless or wired connection interface or port that is configured to receive an input made via an input device, such as a game controller, keyboard, etc.

The user interface 120 may receive a user input, and the electronic device 100 may operate according to the user input.

The processor 130 according to an embodiment may control the overall operations of the electronic device 100. The processor 130 may execute one or more instructions of a program stored in the memory 140. The processor 130 may include a hardware component performing arithmetic operations, logic operations, input/output operations, and signal processing.

The processor 130 may include at least one of, for example, a central processing unit (CPU), a micro-processor, a graphics processing unit (GPU), an application specific integrated circuit (ASIC), a digital signal processor (DSP), a digital signal processing device (DSPD), a programmable logic device (PLD), a field programmable gate array (FPGA), an application processor (AP), a neural processing unit, or an artificial intelligence-dedicated processor designed in a hardware structure specialized for processing of an artificial intelligence model, but is not limited thereto.

The processor 130 according to an embodiment may store data representing a history information of frame timings by using frame history and HW measurement module 402. The history information may include the most recent frame's rendering duration, but is not limited thereto.

The processor 130 according to an embodiment may store data representing hardware statistics by using frame history and HW measurement module 402. The hardware statistics may include CPU load, frequency and temperature, but are not limited thereto.

The processor 130 according to an embodiment may control the frame buffer queue by using frame start control module 404. When the application requests a new buffer for drawing a new frame, the frame start control module 404 may effectively not fulfil/delay fulfilment of the request. The frame start control module 404 may receive, as an input, a timestamp/start time indication from the frame generation prediction module 408.

The processor 130 according to an embodiment may monitor frame rate stability to determine the frame rate stability by using monitoring module 406. The monitoring module 406 may determine that the frame rate stability is unacceptable if less than a predetermined proportion (e.g., 99%) of the measured frame rates over a predetermined period fall within a predetermined margin (e.g., ±20%) of the median frame rate.

The processor 130 according to an embodiment may monitor workload and/or temperature of a device executing the application by using the monitoring module 406. The monitoring module 406 may determine that if the monitored workload exceeds a predetermined threshold and/or the monitored temperature exceeds a predetermined threshold, then the method of the controlling rendering of images may cease, and for example may revert to default operating system frame buffer management for image rendering.

The processor 130 according to an embodiment may calculate a next frame generation duration based on history information of frame timings by using frame generation prediction module 408. The frame generation prediction module 408 may calculate a safety parameter.

The processor 130 according to an embodiment may calculate a next frame generation start time to enable the generation of the next frame to be completed before a next display refresh of next VSYNC based on the predicted next frame generation duration by using frame generation prediction module 408. The frame generation prediction module 408 may generate the final start time/timestamp and provide the final start time/timestamp to the frame start control module 404.

The memory 140 may include for example, a non-volatile memory including at least one of a flash memory, a hard disk, a multimedia card micro type memory, a card type memory (for example, a secure digital (SD) or extreme digital (XD) memory), read-only memory (ROM), electrically erasable programmable read-only memory (EEPROM), programmable read-only memory (PROM), a magnetic memory, a magnetic disk, or an optical disk, and a volatile memory, such as a random access memory (RAM) or a static random access memory (SRAM).

The memory 140 may store instructions, data structures, and program codes, which may be read by the processor 130. The memory 140 may store data and program instruction codes corresponding to image rendering control module 400, including frame history and HW measurement module 402, frame start control module 404, monitoring module 406, and frame generation prediction module 408.

According to embodiments, operations performed by the processor 130 may be implemented by executing program instructions or codes stored in the memory 140.

Figure 2A:
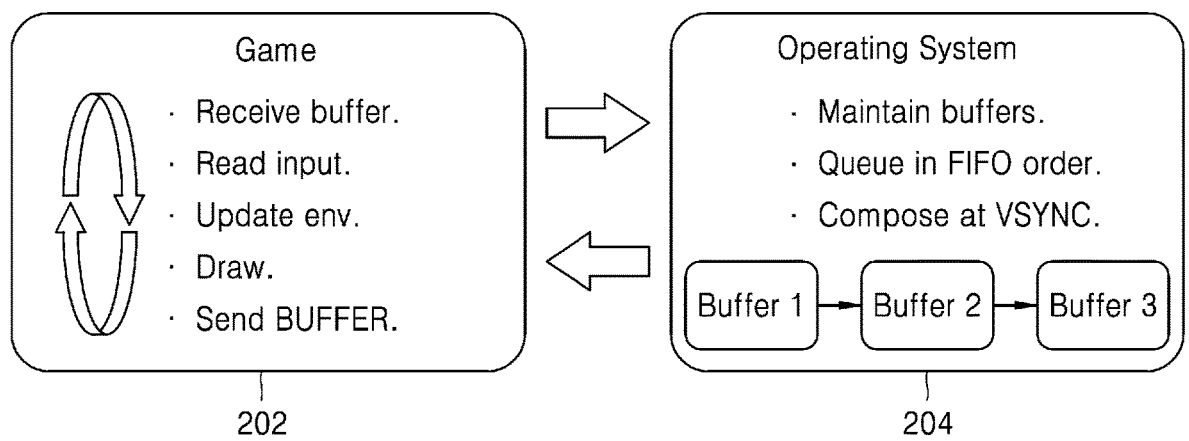
FIG. 2A is a diagram of an application 202 executing interacting with an OS 204 during image rendering, according to an embodiment.

FIG. 2A is a diagram of application 202 interacting with an OS 204 during image rendering, according to an embodiment. For example, the application 202 may be executed on the electronic device 100.

For the convenience of description, the application 202 will be described as a game. However, embodiments are not limited thereto, and the application 202 may be another type of computer program, including applications, such as graphics packages, video players, etc. For example, the user interface 120 may provide improved touch scrolling.

The application 202 may perform a sequence of actions that includes receiving a frame buffer from the OS 204 in response to a request; reading one or more user inputs; updating the game environment in response to the user inputs; drawing/rendering the updated state of the environment into the received frame buffer, and transferring the frame buffer to the OS for display on the screen of the electronic device 100.

The OS 204, (for example, Android™), may be in charge of managing and displaying one or more frame buffers. For example, the OS 204 may control management and display of three frame buffers, and can perform operations including maintaining a queue of the three buffers; queuing buffers received from the game and displaying them in order, and composing the final image to send to the display driver at a refresh time. For example, the OS 204 may receive a Vertical Sync (VSYNC) signal indicating the time the display is to be refreshed, and may send the final image to the display driver based on the VSYNC signal.

Figure 2B:
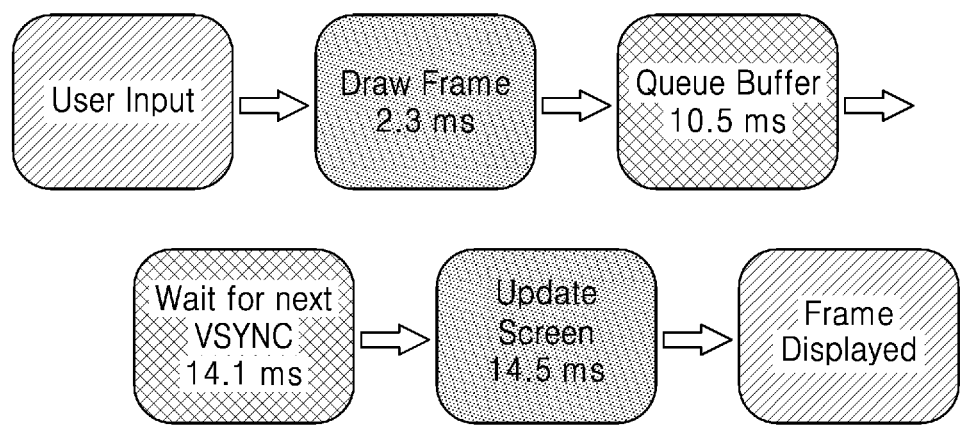
FIG. 2B is a diagram illustrating an image rendering process, according to an embodiment.

FIG. 2B is a diagram illustrating a part of an image rendering process.

One or more embodiments reduce the latency between reading the user input and displaying the resulting frame.

In practice, there can be several operations between these two events. To give an example, when executing the game application "A" on the "B" mobile device, following the receipt of user input, it can take 2.3 ms to draw the resulting frame; 10.5 ms to queue the frame in the frame buffer; 14.1 ms to wait for the next VSYNC and 14.5 ms to update the screen in order for the frame to be displayed. One or more embodiments reduce the latency by reducing the time the buffer is queued and waiting for the next display refresh/VSYNC.

A method by which the time is reduced, according to an embodiment, will be further described with reference below.

Figure 3:
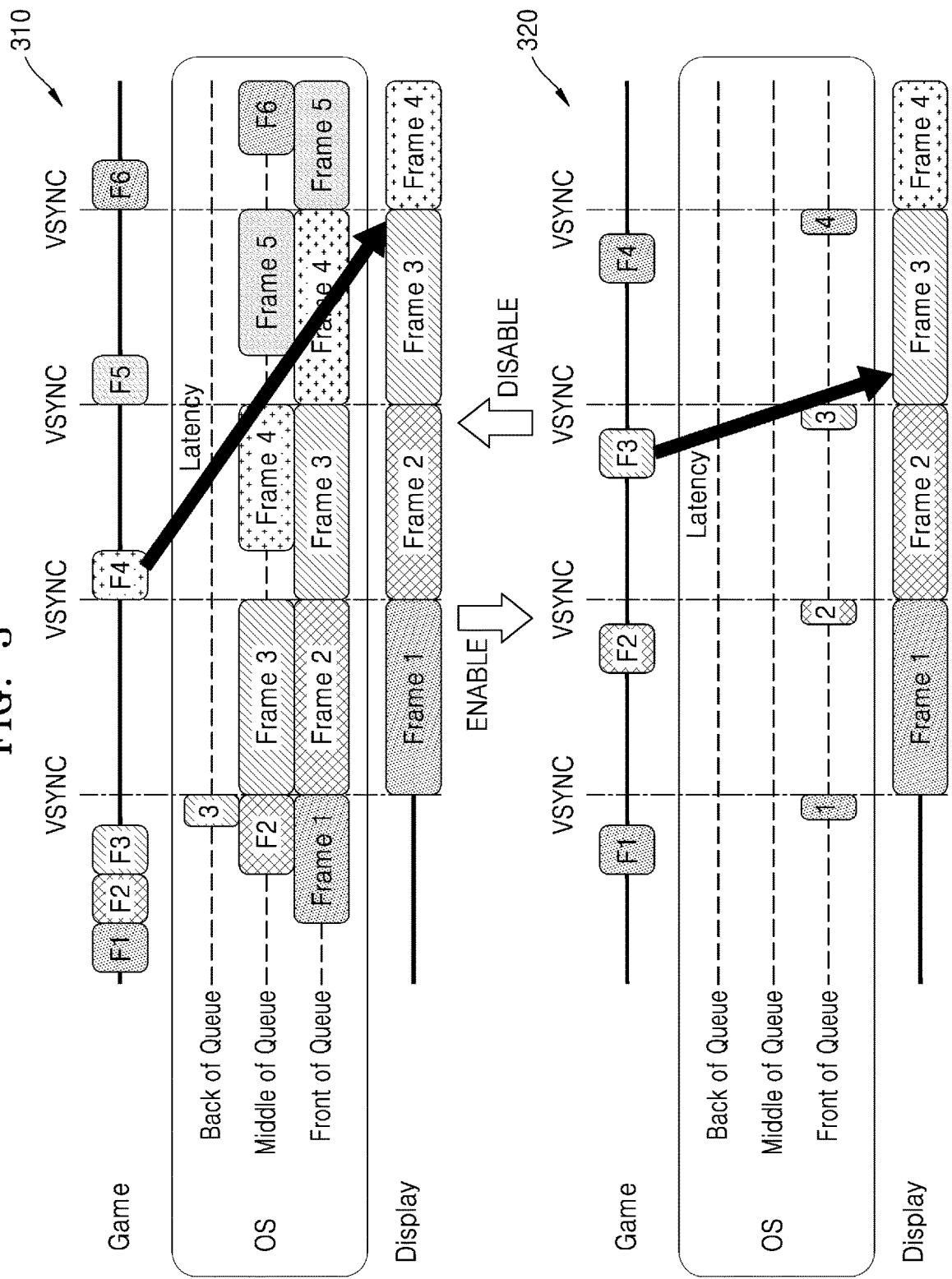
FIG. 3 is a diagram illustrating activation and deactivation of the controlling rendering of the image, according to an embodiment.

FIG. 3 is a diagram illustrating activation and deactivation of the controlling rendering of the image, according to an embodiment.

According to an embodiment, the electronic device 100 may enable and disable controlling the rendering of the image based on the rendering latency. For example, the electronic device 100 may identify whether to control the rendering of the image based on the rendering latency, and may enable the rendering of the image based on the rendering latency and disable the rendering of the image based on the rendering latency.

In FIG. 3, the time between VSYNCS is 16.6 ms and the time to send to display has been omitted for the convenience of description. Frames flow down from the game into the display through the queue. Time flows left to right in the FIG. 3.

The timing diagram 310 illustrates a case in which the electronic device 100 has disabled control of the rendering of the image based on the rendering latency, and the image rendering process is under normal OS control.

In the timing diagram 310 the game application generates three frames F1 to F3 and issues requests to the OS for frame buffers to display each of these. The maximum number of buffers allocated at a time is three and so F1 must be displayed before the next frame, F4, can start to be generated, which is the next frame of F3. Thus, while F1 is being displayed, the game can recognize user input but cannot draw new frames and must wait for the next frame buffer, which will become available at the next VSYNC. Because all the queues are full while F1 is being displayed, F4 and all subsequent frames can take a long time to be displayed.

Latency increases significantly when the frames per second (FPS) generated by the application reaches the maximum FPS displayable. For example, the latency increase may be due to the buffer queue from the OS filling up with frames required to be shown in order. To enable maximum throughput frames, the electronic device 100 should start to generate the next frame as soon as a frame buffer is available. If a frame is added to the back of the queue and there are two other frames waiting to be displayed before the frame, then its latency increases drastically. The OS's buffer management system operates as a queue: buffers are inserted into the queue in the same order as their contents are displayed without skipping. There is a limit to rate of frames that can be shown to the user (for example, leave the queue). This limit is the refresh rate or VSYNC rate. If the application produces frames at a faster rate than the screen is able to display, then the queue will be completely filled. Thus, there will be latency between when frames are added to the back of the queue and when the frames are displayed.

The timing diagram 320 illustrates a case in which the electronic device 100 has enabled control of the rendering of the image based on the rendering latency has been enabled, and the image rendering process is under the rendering control module of the electronic device's control.

According to an embodiment, the electronic device 100 may control when frame buffers are made available to the application, thereby controlling when the application reads user input and generates the frame.

The electronic device 100 may calculate how long it will take to display a particular frame in order to start processing the frame at the best time and make the frame buffer available so that the frame rendering finishes just in time for the next VSYNC.

As can be seen from the arrows labelled "latency," by enabling control of rendering based on the rendering latency, the electronic device 100 can improve user interaction with the game and reduce latency between action and reaction compared with the rendering process under normal OS control.

According to an embodiment, the electronic device 100 may control the generation of frames so that they finish rendering just in time to be displayed at the next display refresh/VSYNC. The electronic device 100 may predict the rendering time of an application's frames. For calculating the rendering time, the electronic device 100 may store data representing a history information of frame timings and, optionally, other hardware statistics. The history information may include the most recent frames and older (for example, older than the X most recent frames, or longer than Y(ms) ago) information may be discarded.

According to an embodiment, the electronic device 100 may measure the risk of incorrect prediction of the rendering time and reduce the incorrect prediction by using a user-definable parameter. Because delaying frames can have repercussions on future frames and so the electronic device 100 may be able to predict the effects of its output on future performance. The electronic device 100 can function from the OS side, extending usual capabilities with a decision making algorithm that can control the start time of frame generation.

Figure 4:
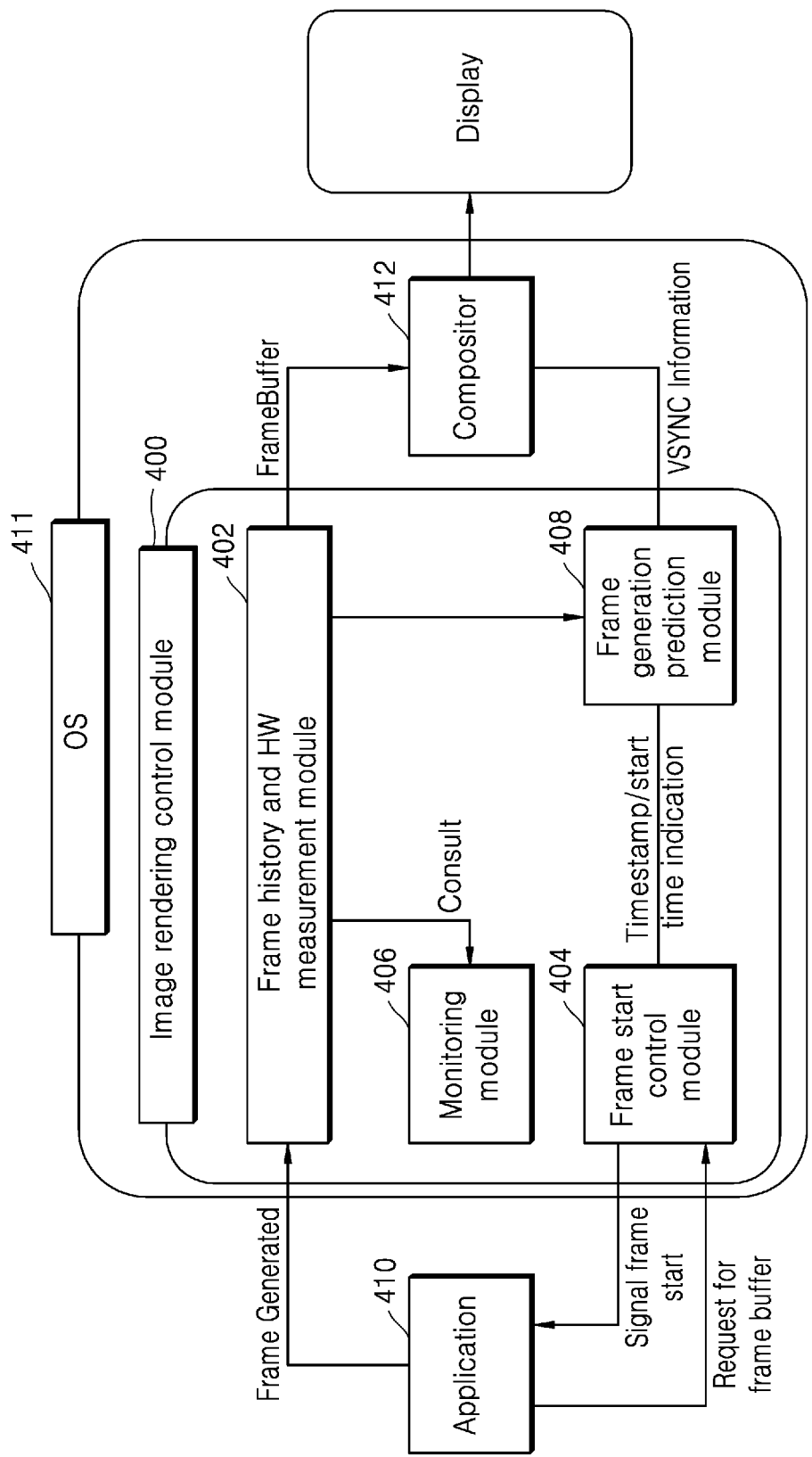
FIG. 4 is a diagram illustrating a plurality of modules executing on the electronic device 100, according to an embodiment.

FIG. 4 is a diagram illustrating a plurality of modules executing on the electronic device 100, according to an embodiment.

Referring to FIG. 4, the electronic device 100 may execute image rendering control module 400 on operating system (OS) 411. The image rendering control module 400 includes frame history and HW measurement module 402, frame start control module 404, monitoring module 406, frame generation prediction module 408. The plurality of modules can interact with an application 410 and the OS 411 For example, the OS 411 may be Android™, OS™ or Tizen™.

According to an embodiment, the frame history and HW measurement module 402 may include a database that stores information about the frames as received from/generated by the application 410. For example, when the application 410 is a game application, the information pertains to the game's data and performance and may include the timestamp the game started rendering a frame; the timestamp the game concluded rendering a frame and, other data such as hardware/OS information about CPU load, frequency and temperature. Embodiments are not limited thereto, and additional information may be stored in the database and one or more of the provided examples may be omitted form the database. The frame history and HW measurement module 402 can also provide the latest frame buffer containing a rendered frame to the compositor 412.

According to an embodiment, the frame start control module 404 may control the frame buffer queue. When the application 410 requests a new buffer for drawing a new frame, the frame start control module 404 may effectively not fulfil/delay fulfilment of the request. The frame start control module 404 may receive as an input a timestamp/start time indication from the frame generation prediction module 408. The frame start control module 404 is intended to fulfil the game application's request for a frame buffer at exactly the time indicated by the timestamp. For example, if the OS 411 is the Android™ OS, the game application's request for a buffer will normally be fulfilled immediately if there is a buffer which is marked as not currently in use by the OS. Otherwise, the game application is forced to wait until a buffer is free.

According to an embodiment, frame start control module 404 causes the OS to mark as many buffers as possible "in use" (usually all except the one the game application currently owns), and only relinquishes one buffer at the calculated frame start timestamp.

According to another embodiment, other parts of the OS may be in charge of scheduling program execution, and the frame start control module 404 may cause the OS to pause execution of the game application's rendering thread from the time when it receives the buffer request until the calculated frame start timestamp.

According to an embodiment, frame generation prediction module 408 typically executes every VSYNC and outputs the timestamp/start time indication at which the frame start control module 404 should allow the game application to start generating the next frame of gameplay. Generating the frame will typically start with the game processing inputs from the user, and the state of the game application (i.e., game world) and UI are updated according to these inputs (or this may already have happened asynchronously). At this point, the game application gathers visual information about everything that will be displayed. This information can be considered a sample of the current state of the game application. The frame generation prediction module 408 may use this sample to predict the frame generation time so that the frame generation can be completed as close as possible to the VSYNC time. The game application then sends this information to the display driver (owned by the OS) in the form of render commands which the display driver understands. The display driver fills the pixels of the received frame buffer according to these commands. In most cases, this operation includes the majority of the render time. After the last render command has been processed, the buffer is ready to be displayed.

Further description of how the prediction can be performed will be detailed below. In general, the frame generation prediction module 408 does not require information regarding the next frame as the prediction is based on the assumption that the next frame will have similarities to recent frames generated by the application 410.

According to an embodiment, monitoring module 406 consults the frame history and HW measurement module 402 periodically. Using the information stored therein, the monitoring module 406 can identify performance metrics that could indicate degraded use, such as a disruption in frame rate, median and frame rate stability. The monitoring module 406 may identify the disruption by comparing the performance metrics with corresponding metric thresholds.

According to an embodiment, the frame rate is the count of frames produced by the game application over a period of time, e.g., in the last second (FPS). The median is an average of these FPS samples calculated during execution. Frame rate stability is the proportion of FPS measurements taken that fall within 20% of the median. The frame history and HW measurement module 402 may calculate these metrics every VSYNC during execution. The monitoring module 406 may consult the frame history and HW measurement module 402 every VSYNC during execution. When one of these metrics falls under a corresponding threshold, then the monitoring module 406 may stop executing the image rendering control method and return buffer management to the default OS method. This can solve problems relating to unforeseen external factors, such as device load increasing, temperature limits being reached, and so on.

If the workload of the processor 130 increases appreciably over a short period of time (due to the game or some other application), or if the device's temperature increases and the processor 130 must be "slowed down" to avoid overheating, then the render time may change significantly. This can make it much harder for frame generation prediction module 408 to accurately predict, possibly making them less effective than the OS's default method. The monitoring module 406 may warn of these situations by monitoring workload and temperature. For example, if the measured workload and/or temperature exceed a certain threshold(s) then the image rendering control module 400 may cease to control image rendering and may revert to allowing the OS to manage frame buffers for rendering.

Figure 5:
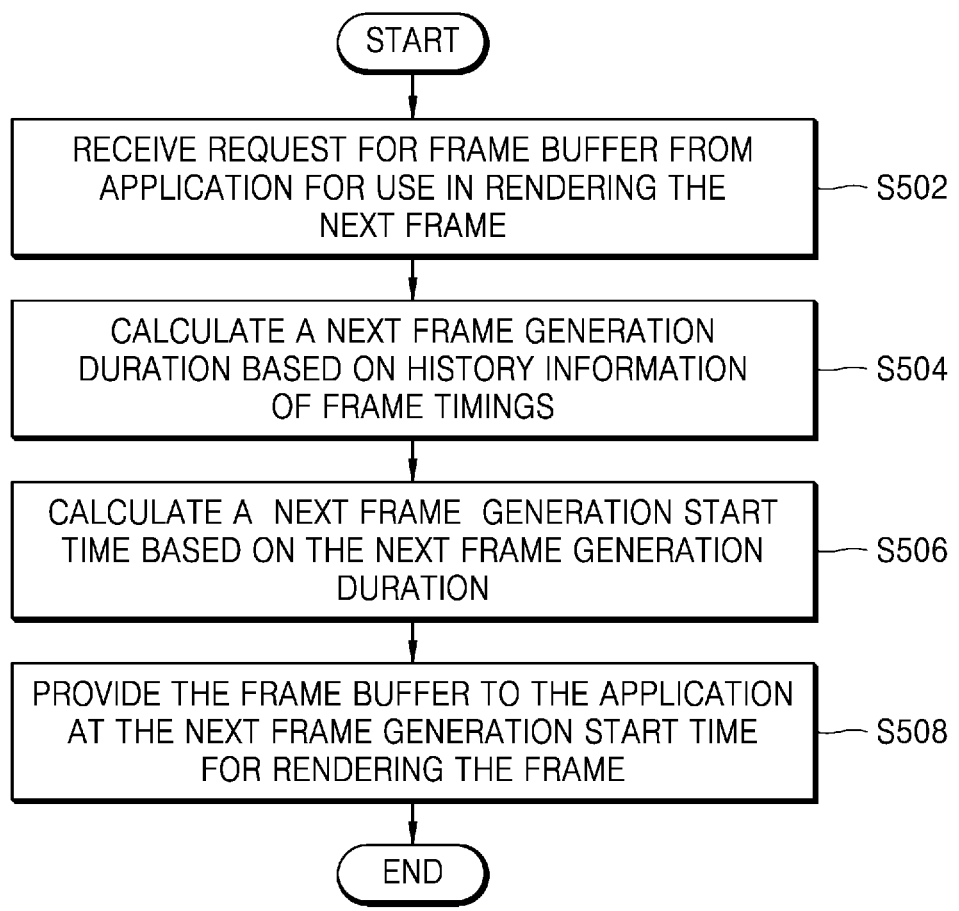
FIG. 5 is a flowchart illustrating a method, performed by an electronic device 100, of controlling image rendering, according to an embodiment.

FIG. 5 is a flowchart illustrating a method, performed by an electronic device 100, of controlling image rendering, according to an embodiment.

The method 500 will typically be invoked when a computer program, e.g., an application, executing on the electronic device 100 renders images. In some cases, the method may be implemented as a "hidden" application, such as Samsung's "Frame Booster" solution that can interact with other applications that render images, although embodiments are not limited thereto, and in other instances a version of the method may be integrated into an application that performs rendering itself.

In operation S502, the electronic device 100 may receive, from application 410, the request for frame buffer for use in rendering the next frame.

The electronic device 100 does not fulfil this request immediately if a frame buffer is available. The electronic device 100 may execute a wait command until the frame generation start time, calculated as detailed below, is sent to the application.

In operation S504, the electronic device 100 may predict the next frame generation duration. The electronic device 100 may calculate a next frame generation duration based on history information of frame timings. For example, the electronic device 100 may calculate the next frame generation duration by calculating how long the generation of the frame is likely to take using historical frame rendering data.

For example, the electronic device 100 may obtain the next frame generation duration by using percentile analysis, reinforcement learning (RL), or the like, but embodiments are not limited thereto.

According to an embodiment, the electronic device 100 may store history information relating to durations of the plurality of historical frame generations, including at least a rendering duration of each of the historical frames. The electronic device 100 may calculate the next frame generation duration based on the stored history information.

According to an embodiment, the electronic device 100 may calculate a safety parameter based on data regarding a plurality of historical generated frames. The electronic device 100 may add a safety parameter to the next frame generation duration as a margin. A detailed description about the safety parameter will be further described with reference to FIG. 7.

In operation S506, the electronic device 100 may calculate the next frame generation start time to enable the generation of the next frame to be completed before a next display refresh of next VSYNC. The electronic device 100 may use the predicted next frame generation duration to calculate a time when the frame generation should start with respect to the next VSYNC.

As previously mentioned, the electronic device 100 may control the start time of frame generation so that the frame finishes rendering just in time to be displayed at the next display refresh.

In operation S508, the electronic device 100 may provide the frame buffer to the application 410 at the next frame generation start time for rendering the frame. The application 410 may then proceed to generate the frame and provide the frame buffer containing the generated frame to the compositor 412 to display the generated frame on the display of the electronic device. Thus, the timing of frame generation can be improved so as to reduce latency and improve responsiveness without requiring the executable code of the application to be modified.

However, it will be understood that embodiments are not limited to the described example, and alternatives are possible. It will be also appreciated that at least some of the operations shown in the Figures herein may be re-ordered or omitted. One or more additional operations may be performed in some cases. Further, although the operations are shown as being performed in sequence in the FIG. 5, in alternative embodiments at least some of them may be performed concurrently. It will also be understood that embodiments can be implemented using any suitable software, programming language, data editors, etc., and may be represented/stored/processed using any suitable data structure or format.

Figure 6:
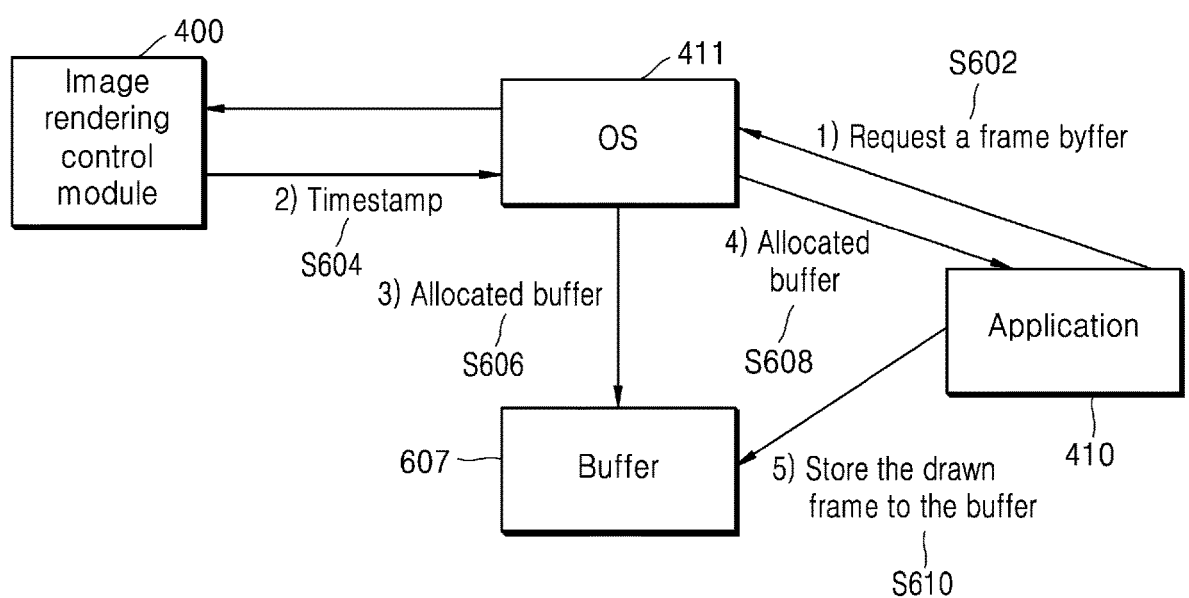
FIG. 6 is a diagram illustrating interaction between modules, according to an embodiment.

FIG. 6 is a diagram illustrating the interaction between modules of the electronic device 100 that can result from the operation of an embodiment.

In operation S602, the application 410 requests a frame buffer from the OS.

In operation S604, the image rendering control module 400 intercepts the request and, based on communication between the frame start control module 404 and the frame generation prediction module 408, generates a calculated start time or timestamp. The image rendering control module 400 may provide the calculated start time (or timestamp) to the OS 411.

In operation S606, the OS 411 allocates a frame buffer 607 at the calculated start time and provides the allocated to the application 410.

In operation S608, the OS responds to the application 410 with the allocated frame buffer. The availability of the frame buffer can be signaled to the application 410 by the frame start control module 404.

In operation S610, the application 410 can start to generate the frame, and store the generated frame in the frame buffer. The electronic device 100 may then proceed with rendering and display using the frame buffer.

Figure 7:
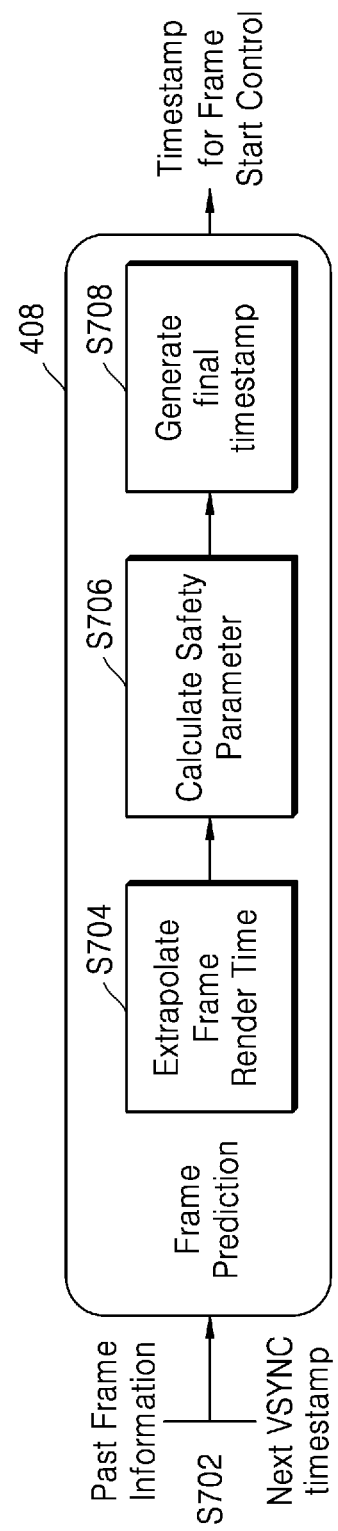
FIG. 7 is a diagram illustrating calculation of a next frame generation start time, according to an embodiment.

FIG. 7 is a diagram illustrating operations involved in calculating a next frame generation start time, as performed by the frame generation prediction module 408, according to an embodiment.

In operation S702, the frame generation prediction module 408 receives data indicating the time of the next display refresh, e.g., the VSYNC signal, as well as historical data from the frame history and HW measurement module 402.

In operation S704, the frame generation prediction module 408 predicts how long the application will take to generate by extrapolating a frame render time from the historical data.

In operation S706, the frame generation prediction module 408 may calculate a safety parameter/margin (as detailed below).

In operation S708, the frame generation prediction module 408 may generate the final start time/timestamp and provide the final start time/timestamp to the frame start control module 404.

According to an embodiment, the start time t can be calculated using the following formula (or equivalent):

$$t = VSYNC_{next} - t_r - S$$

wherein $VSYNC_{next}$ is the time of the next VSYNC (as provided by the OS compositor); $t_r$ is the predicted rendering time for the next frame to be produced by the application, and S is a safety parameter that can be added to the predicted time to ensure that the application is able to complete the rendering work on time.

According to an embodiment, the safety parameter, S, can be composed of two terms: $S = t_{tip} + C$ wherein C is a constant that can be set by an expert engineer on a per-game basis. For example, C may be initially set to 0 and modified by based on issues in testing. Further, $t_{tip}$ is an estimate of the amount of time it takes for the OS to provide a buffer and unblock the game after the frame generation start time has passed.

From the application's perspective, "unblocking" here is when execution of the OS's code finishes and execution of the application's code is allowed to continue. There may be more tasks to complete on the OS's side after the wait command has completed and before the game application continues. For instance, the game application and the compositor may run in different processes in the system. Therefore, besides bookkeeping and handing over the buffer, there may be some inter-process communication to complete before the game application is effectively unblocked, which may take a small amount of extra time. It will be further described with reference to FIG. 9.

According to an embodiment, the frame generation prediction module 408 may recalculate the start time t at every execution and may take into account a plurality of parameters, including variance of frame render times and inter-process communication times.

The frame generation prediction module 408 may calculate the start time using, for example, any of the following methods: percentile analysis; linear regression; reinforcement learning. These methods are examples, and embodiments are not limited thereto.

According to an embodiment, the parameters such as the variance of frame render times may be part of the frame render duration estimation depending on which method is used, e.g., percentile analysis can indirectly take it into account because a more varied distribution would have a higher threshold, for example, $99^{th}$ percentile. Other parameters, such as inter-process communication times (which are not part of the rendering time), may be factored into the safety parameter using, for example, a separate run of percentile analysis or a predetermined constant.

Reinforcement Learning (RL), as used by some embodiments, is a machine learning-based method of calculating $t_r$. A model is trained by rewarding an RL system based on how closely it can estimate $t_r$ to the true rendering time, based on the historical data. The RL system is penalized if the data shows the estimated value of $t_r$ would result in a missed frame. The severity of this penalty may be adjusted based on a user/developer-adjustable training parameter.

Figure 8A:
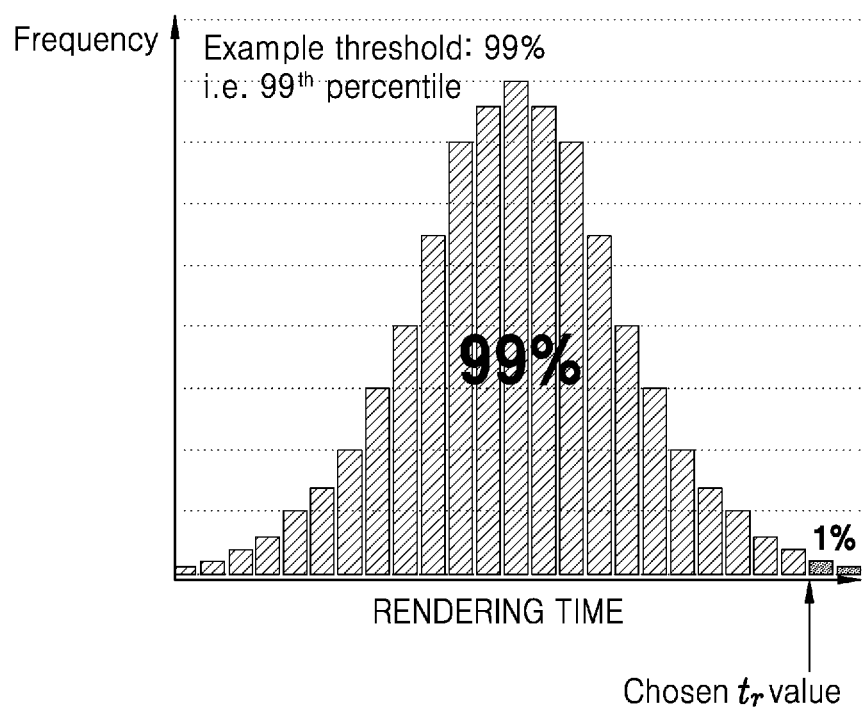
FIG. 8A is a diagram illustrating percentile analysis for predicting rendering time $t_r$ for the next frame, according to an embodiment.

FIG. 8A is a diagram illustrating the percentile analysis for predict the rendering time $t_r$ for the next frame, according to an embodiment.

According to an embodiment, the electronic device 100 may calculate the next frame generation start time using percentile analysis on the plurality of historical generated frames.

Percentile analysis as used by an embodiment may involve calculating the distribution of the N most recent rendering times and selecting a value for $t_r$ that is larger than a certain percentage threshold (for example, 99% as shown in the FIG. 8A) of those N timings. This indicates rendering of the next frame is estimated to take $t_r$ time or less with a likelihood equal to the threshold value (ignoring the safety parameter S). The threshold can be adjusted by a user/developer, e.g., based on observations, to balance the risk of a missed frame against potential latency reduction.

Figure 8B:
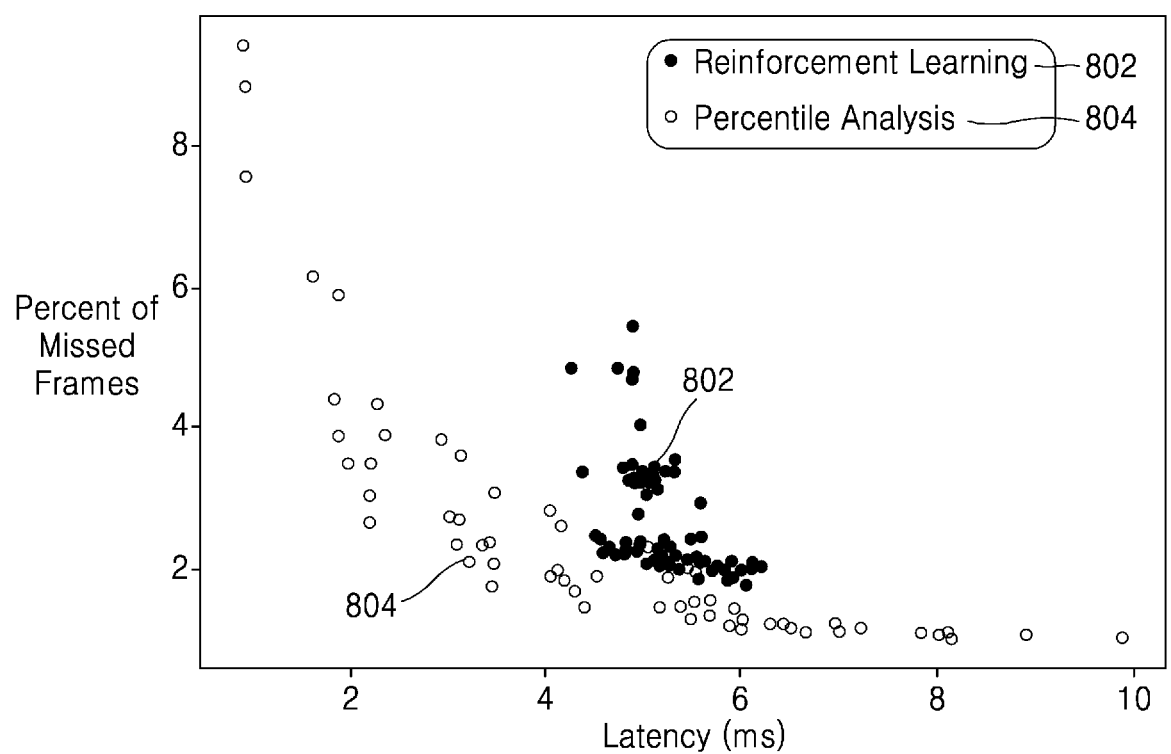
FIG. 8B is a diagram illustrating a scatter graph indicating how latency can be reduced using percentile analysis and reinforcement learning, according to an embodiment.

FIG. 8B is a diagram illustrating a scatter graph indicating how latency can be reduced using percentile analysis and RL, according to an embodiment.

Referring to FIG. 8B, each data point corresponds to a different choice of hand-tuned parameters in the predictive models for $t_r$, e.g., different threshold values for Percentile Analysis 804 and different missed frame penalties for Reinforcement Learning 802. The X axis shows the real total latency (in ms) rather than the estimated $t_r$.

Figure 9:
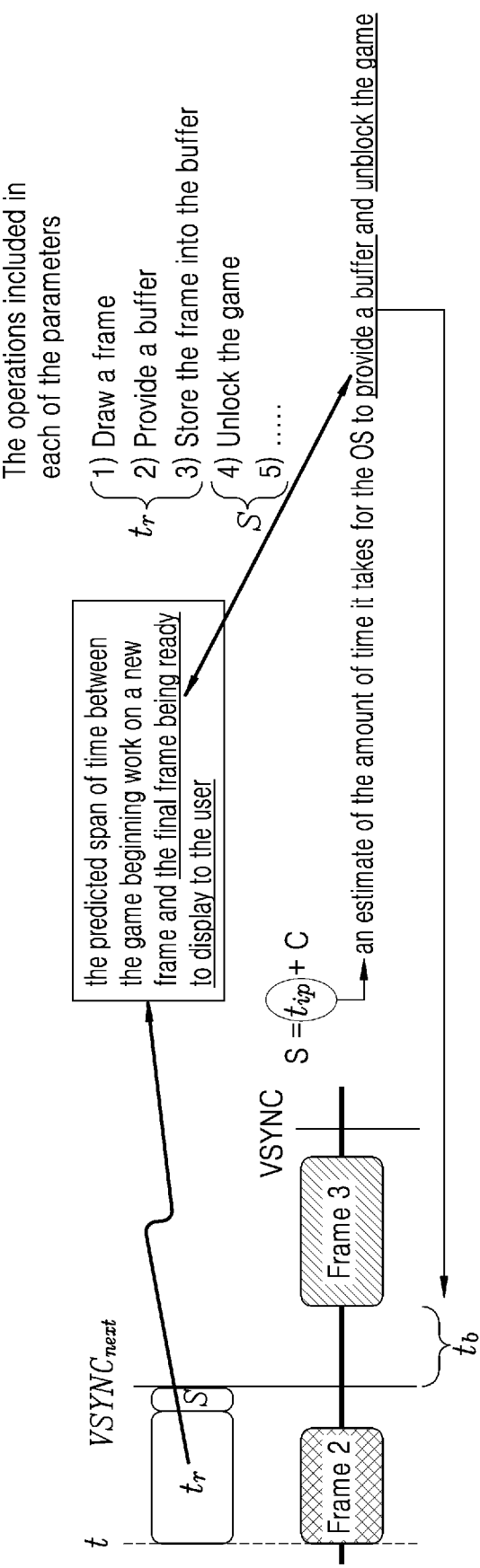
FIG. 9 is a diagram illustrating the amount of time it takes for the OS to provide a buffer and unblock the game after the frame generation start time has passed according to an embodiment.

FIG. 9 is a diagram illustrating $t_{tip}$ in relation to two adjacent frames, Frame 2 and Frame 3, whereby $t_{tip}$ an estimate of the amount of time it takes for the OS to provide a buffer and unblock the game after the frame generation start time t has passed according to an embodiment.

The frame history database of frame history and HW measurement module 402 may keep track of previously calculated frame generation start times, as well as the measured exact time when the game was unblocked and frame generation began. The differences between these times are examples of $t_{tip}$ in previous frames. To predict $t_{tip}$ for the next frame, the frame history database is consulted and a process, such as percentile analysis, can be performed on the calculated data. For example, in the percentile analysis, the $99^{th}$ percentile may be chosen as the predicted value. On-device measurements in experiments showed that the value is typically 0.5 ms.

According to an embodiment, $t_{tip}^j$ for any frame j in the past can be measured as $t_s^j - t_b^j$ where $t_s^j$ is the measured time when generation of the frame started (i.e., the start time calculated by the component) and $t_{tip}^F$ is the time the buffer was provided and frame generation actually began. To predict this t F for a frame F in the future, percentile analysis can be used. The frame history database can contain the $t_{tip}^j$ value for previous frames j=[F−1, F−N], N=50, for instance. From this history a sorted list of these values v (in order of magnitude) can be obtained. Embodiments may use standard linear interpolation method for percentile calculation:

$$v(x) = v_{\lfloor x \rfloor} + (x \, \%1)(v_{\lfloor x \rfloor + 1} - v_{\lfloor x \rfloor})$$

where $v_i$ is the element in i position of the list v, and % refers to the float modulo operation, whereby, for example, 4.6%1 gives 0.6.

To obtain percentile p the value of x given by: x=N−p+0.5 may be applied. In some embodiments p=0.99 may be used to obtain the $99^{th}$ percentile. This value can be taken as the prediction for t p. It will be appreciated that these values are examples only and variations may be used.

Embodiments may be capable of making decisions at several granularities, e.g., a user/developer can choose the delay of every frame individually, or choose a single delay for the next batch of frames (in order to perform the delay calculations less frequently and reduce the computational load). The batch size may be variable. Embodiments can be Graphics API agnostic and work with APIs such as Vulkan™ and OpenGLES™. Embodiments can offer a trade-off between safety and reduced latency.

It is understood that according to an exemplary embodiment, a computer readable medium, such as a non-transitory computer readable medium, storing a computer program to operate a method according to the foregoing embodiments is provided.

All of the features disclosed in this specification (including any accompanying claims, abstract and drawings), and/or all of the operations of any method or process so disclosed, may be combined in any combination, except combinations where at least some of such features and/or operations are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

While embodiments have been described with reference to the figures, it will be understood by those of ordinary skill in the art that various changes in form and detail may be made therein without departing from the spirit and scope as defined by the following claims.

What is claimed is:

1. A method of controlling rendering of images, the method comprising:
   receiving a request for a frame buffer from an application;
   identifying a next frame generation duration based on history information of frame timings;
   identifying a next frame generation start time based on a sync time corresponding to a next vertical sync (VSYNC) signal and the next frame generation duration; and
   providing the frame buffer to the application at the next frame generation start time.

2. The method of claim 1, wherein the identifying of the next frame generation duration comprises:
   storing a rendering duration of each of a plurality of historically generated frames as the history information; and
   identifying the next frame generation duration based on the history information.

3. The method of claim 1, wherein the identifying the next frame generation duration comprises:
   identifying a safety parameter based on data about a plurality of historically generated frames; and
   including the safety parameter with the next frame generation duration as a margin.

4. The method of claim 3, wherein the identifying of the safety parameter comprises:
   identifying, for at least two of the plurality of historically generated frames, differences between a measured time when an operating system provided the frame buffer and unblocked the application, and an actual next frame generation start time.

5. The method of claim 3, wherein the identifying of the next frame generation start time comprises:
   identifying the next frame generation start time using percentile analysis on the plurality of historically generated frames.

6. The method of claim 1, further comprising:
   monitoring frame rate stability;
   identifying the frame rate stability falls below a threshold; and reverting to default operating system frame buffer management for the rendering of images by disabling image rendering control, based on the frame rate stability falling below the threshold.

7. The method of claim 6, wherein the monitoring frame rate stability comprises:
   identifying a median frame rate based on a plurality of measured frame rates, each of which indicates a number of frames generated in one second;
   identifying the frame rate stability falls below the threshold based on less than a predetermined proportion of the plurality of measured frame rates over a predetermined period falling within a predetermined margin of the median frame rate.

8. The method of claim 1, further comprising:
   monitoring any one or any combination of workload of a device or a temperature of the device;
   reverting to default operating system frame buffer management for the rendering of images by disabling image rendering control based on the workload exceeding a workload threshold; and
   reverting to default operating system frame buffer management for the rendering of images by disabling image rendering control based on the temperature exceeding a temperature threshold.

9. The method of claim 1, wherein the identifying the next frame generation start time comprises:
   identifying a safety parameter based on data about a plurality of historically generated frames; and
   identifying the next frame generation start time based on a formula:

$$t = \text{VSYNC}_{next} - t_r - S$$

wherein $\text{VSYNC}_{next}$ represents a next display refresh; $t_r$ represents the next frame generation duration, and $S$ represents the safety parameter.

10. The method of claim 9, wherein the safety parameter is identified using the data about the plurality of historically generated frames and a formula:

$$t_s^j - t_b^j$$

wherein $t_s^j$ represents a generation time when generation of a historical frame j, from among the plurality of historically generated frames, started, and $t_b^j$, represents a providing time when the frame buffer was provided for the historical frame j,
   predicting the next frame generation duration for a next frame F using percentile analysis on the data about the plurality of historically generated frames, wherein the next frame generation duration for the next frame F equals $t_s^F - t_b^F$, and
   wherein $t_s^F$ represents the next frame generation start time, and $t_b^F$ represents a providing time when the frame buffer will be provided for the next frame F.

11. An electronic device for controlling rendering of images, the electronic device comprising:
   a memory storing a program including at least one instruction; and
   at least one processor configured to execute the at least one instruction to control the electronic device to:
   receive a request for a frame buffer from an application,
   identify a next frame generation duration based on history information of frame timings,
   identify a next frame generation start time based on a sync time corresponding to a next vertical sync (VSYNC) signal and the next frame generation duration, and
   provide the frame buffer to the application at the next frame generation start time.

12. The electronic device of claim 11, wherein the at least one processor is further configured to execute the at least one instruction to control the electronic device to:
   store a rendering duration of each of a plurality of historically generated frames as the history information, and
   identify the next frame generation duration based on the history information.

13. The electronic device of claim 11, wherein the at least one processor is further configured to execute the at least one instruction to control the electronic device to:
   identify a safety parameter based on data about a plurality of historically generated frames, and
   include the safety parameter with the next frame generation duration as a margin.

14. The electronic device of claim 13, wherein the at least one processor is further configured to execute the at least one instruction to control the electronic device to:
   identify, for at least two of the plurality of historically generated frames, differences between a measured time when an operating system provided the frame buffer and unblocked the application, and an actual next frame generation start time.

15. The electronic device of claim 13, wherein the at least one processor is further configured to execute the at least one instruction to control the electronic device to:
   identify the next frame generation start time using percentile analysis on the plurality of historically generated frames.

16. The electronic device of claim 11, wherein the at least one processor is further configured to execute the at least one instruction to control the electronic device to:
   monitor frame rate stability,
   identify whether the frame rate stability falls below a threshold, and
   revert to default operating system frame buffer management for the rendering of images by disabling image rendering control, based on the frame rate stability falling below the threshold.

17. The electronic device of claim 16, wherein the at least one processor is further configured to execute the at least one instruction to control the electronic device to:
   identify a median frame rate based on a plurality of measured frame rates, each of which indicates a number of frames generated in one second, and
   identify the frame rate stability falls below the threshold based on less than a predetermined proportion of the plurality of measured frame rates over a predetermined period falling within a predetermined margin of the median frame rate.

18. The electronic device of claim 11, wherein the at least one processor is further configured to execute the at least one instruction to control the electronic device to:
   monitor any one or any combination of a workload of the electronic device or a temperature of the electronic device,
   revert to default operating system frame buffer management for the rendering of images by disabling image rendering control based on the workload exceeding a workload threshold, and
   revert to default operating system frame buffer management for the rendering of images by disabling image rendering control based on the temperature exceeding a temperature threshold.

19. The electronic device of claim 11, wherein the at least one processor is further configured to execute the at least one instruction to control the electronic device to:
- identify a safety parameter based on data about a plurality of historically generated frames; and
- identify the next frame generation start time based on a formula:

$$t = VSYNC_{next} - t_r - S$$

wherein $VSYNC_{next}$ represents a next display refresh; $t_r$ represents the next frame generation duration, and S represents the safety parameter.

20. A non-transitory computer-readable recoding medium having recorded thereon a program for executing a method, the method including:
- receiving a request for a frame buffer from an application;
- identifying a next frame generation duration based on history information of frame timings;
- identifying a next frame generation start time based on a sync time corresponding to a next vertical sync (VSYNC) signal and the next frame generation duration; and
- providing the frame buffer to the application at the next frame generation start time.

* * * * *